UNITED STATES PATENT OFFICE.

ARCHIBALD B. VANDEMARK, OF JERSEY CITY, NEW JERSEY.

IMPROVEMENT IN THE MANUFACTURE OF ARTIFICIAL ASPHALT ROCK.

Specification forming part of Letters Patent No. 117,946, dated August 8, 1871; reissue No. 4,591, dated October 10, 1871.

*To all whom it may concern:*

Be it known that I, ARCHIBALD B. VANDEMARK, of Jersey City, in the county of Hudson and State of New Jersey, have invented a new and useful Improvement in the Manufacture of Artificial Asphalt Rock; and I do hereby declare the following to be a full, clear, and exact description thereof, which will enable those skilled in the art to make and use the same.

The object of this invention is to impregnate calcareous substances with bitumen, thereby producing an artificial asphalt rock which can be used with advantage for pavements and for roofing, which shall be impervious to water, unaffected by the heats of summer or the frosts of winter, fine-grained, homogeneous, tough, and durable. The invention consists in the combination, mixture, and appliance of the constituent parts, viz.: bitumen or its chemical equivalent, paraffine or its chemical equivalent, and a calcareous substance such as calcareous rock, lime, or carbonate of lime, which constituents, when properly mixed together, compose the artificial asphalt rock.

The above-named ingredients are mixed together in about the following proportion: Bitumen or asphaltum of commerce, from fifty to ninety-five parts; paraffine-oil or other heavy hydrocarbon liquid, from fifty to five parts.

These ingredients are placed in a proper vessel, where they are heated to a temperature above 200° and below 300°, or just below the temperature which would be destructive to the bitumen, or which would cause the escape of essential oils from said bitumen. While being heated the mass is constantly agitated until the bitumen and oil become thoroughly mixed and take the appearance of a thick liquid of a homogeneous character. At the same time a quantity of calcareous stone or other calcareous substance, such as limestone, or chalk, or marl, which has been pulverized by suitable means, is heated in a separate vessel until the same is freed from all moisture. This calcareous powder is then mixed with the compound of bitumen and oil in about the following proportion: Calcareous powder, from sixty to eighty-five parts; compound of bitumen and oil, from forty to fifteen parts.

Both the bituminous compound and the calcareous powder are placed, in a heated state, in a suitable vessel, where the same are heated and agitated until the calcareous powder becomes thoroughly impregnated with the bituminous compound, and all the ingredients are united to a homogeneous mass. The composition thus obtained forms the subject-matter of this present application for a patent.

When this composition is to be used for the pavement of streets, for sidewalks, alleys, or paths, a foundation is first made of broken stones, evenly rolled, or of cement or any other sort of foundation which is firm and tolerably uniform, and upon this foundation the above-described composition is spread hot, and then rolled down smoothly and solidly as it hardens.

The thickness in which the composition is laid down depends upon the nature of the street or walk, a layer of one-half inch being sufficient for narrow pathways, and a layer of two inches or more in thickness for heavily-traveled streets.

When said composition is to be used for roofing purposes the proportion between the calcareous powder and the bituminous compound may be changed, said ingredients being mixed together in about equal parts. The preparation is then poured hot upon the roof in a thin sheet, and suitably rolled while hardening.

The proportion of oil in the bituminous compound is governed by different climates, and also by the nature of the bitumen used in the compound. For cold climates more oil is used than for hot climates.

The pavements which have heretofore been made of sand, gravel, broken stones, and coal-tar or asphaltum, have been subject to defect in wear by reason of the non-union or imperfect union of the strong portions with the cementing or binding portions of the compound, whereby, under the influence of the elements and the abrasion of travel, the stone, gravel, or sand works out and becomes separated from the remainder of the mass, which then becomes rough or rutted and in the way of early destruction.

In the artificial asphalt rock prepared according to the above description the calcareous substance becomes thoroughly impregnated with the bituminous compound, forming a homogeneous mass, which, when properly laid, presents a smooth surface, and continues smooth by wear; and furthermore, a pavement prepared from this asphalt rock is exceedingly tough, resisting fracture admirably, and, from the character of its constituent parts and their manner of union, will resist equally well the heat or the cold.

What I claim as new, and desire to secure by Letters Patent, is—

1. An artificial asphalt rock, made substantially in the manner herein described.

2. Combining bitumen and paraffine oil, or their chemical equivalents, and calcareous substances, substantially in the manner and about in the proportions herein set forth.

This specification signed by me this 18th day of September, 1871.

A. B. VANDEMARK.

Witnesses:
W. HAUFF,
C. WAHLERS.

(110)